United States Patent
Zeitler et al.

(10) Patent No.: US 7,482,424 B2
(45) Date of Patent: Jan. 27, 2009

(54) PROCESS FOR THE PREPARATION OF POLYMERIC HYDROXYALKYL TERMINATED POLYSULPHIDES

(75) Inventors: Michael Zeitler, Alfter (DE); Nils Kottner, Rottweil (DE); Manfred Bergfeld, Erlenbach-Mechenhard (DE)

(73) Assignee: Akzo Nobel N.V., Arnhem (NL)

( * ) Notice: Subject to any disclaimer, the term of this patent is extended or adjusted under 35 U.S.C. 154(b) by 10 days.

(21) Appl. No.: 11/664,353

(22) PCT Filed: Sep. 16, 2005

(86) PCT No.: PCT/EP2005/009959

§ 371 (c)(1), (2), (4) Date: Jul. 2, 2007

(87) PCT Pub. No.: WO2006/037441

PCT Pub. Date: Apr. 13, 2006

(65) Prior Publication Data

US 2007/0249860 A1    Oct. 25, 2007

(30) Foreign Application Priority Data

Oct. 1, 2004    (DE) .................. 10 2004 047 791

(51) Int. Cl.
*C08G 4/00* (2006.01)
(52) U.S. Cl. ..................... 528/265; 528/265
(58) Field of Classification Search .......... 528/265
See application file for complete search history.

(56) References Cited

U.S. PATENT DOCUMENTS

| 2,582,605 A | 1/1952 | Richter et al. |
| 3,301,831 A | 1/1967 | Ludwig et al. |
| 3,335,201 A | 8/1967 | Bertozzi |
| 3,817,947 A | 6/1974 | Bertozzi |
| 4,124,645 A | 11/1978 | Bertozzi |
| 2005/0119449 A1 | 6/2005 | Zeitler et al. |
| 2006/0142616 A1 | 6/2006 | Zeitler et al. |

FOREIGN PATENT DOCUMENTS

| DE | 42 14 847 A1 | 11/1993 |
| DE | 102 23 283 | 7/2003 |
| DE | 102 20 383 A1 | 11/2003 |
| DE | 103 23 839 | 10/2004 |
| EP | 0 043 043 A | 1/1982 |
| WO | WO 2006/037442 | 4/2006 |

OTHER PUBLICATIONS

Written Opinion of the International Search Authority, PCT International Patent Application No. PCT/EP2005/009959.
International Search Report, PCT International Application No. PCT/EP2005/009959 (translated).
International Preliminary Report on Patentability, PCT International Application No. PCT/EP2005/009959 (with partial translation).

*Primary Examiner*—Elvis O Price
(74) *Attorney, Agent, or Firm*—Kenyon & Kenyon LLP

(57) ABSTRACT

The invention relates to a method for production of polymeric hydroxylalkyl terminated polysulphides, whereby monomeric hydroxylalkyl terminated polysulphides are reacted with formaldehyde in the presence of an acid catalyst in the form of a solid acid, in particular, an acidic ion exchanger, in which the reaction water and optional added solvent and catalyst are separated off. The products are characterized by a very high uniformity (low polydispersity) and can advantageously be functionalized with subsequent reactions.

20 Claims, No Drawings

PROCESS FOR THE PREPARATION OF POLYMERIC HYDROXYALKYL TERMINATED POLYSULPHIDES

FIELD OF THE INVENTION

The invention pertains to a process for the preparation of polymeric hydroxyalkyl, in particular hydroxyethyl terminated polysulphides through the reaction of monomeric hydroxyalkyl terminated polysulphides, in particular dithioglycols, with formaldehyde in the presence of an acid catalyst.

BACKGROUND OF THE INVENTION

Polymeric hydroxyalkyl terminated polysulphides as well as the preparation thereof have long been known.

Thus, U.S. Pat. No. 2,582,605 discloses a process where, for instance, bis-β-hydroxyethyl disulphide is condensed with itself or with other compounds having hydroxy groups such as glycols, in order to form corresponding polyethers. As catalyst, para-toluene sulphonic acid is mentioned.

Further, it is known from U.S. Pat. No. 4,124,645 that the preparation of such polymeric hydroxyalkyl terminated polysulphides apart from through polyether formation with itself or another polyether can be effected through the reaction of formaldehyde with the monomeric hydroxalkyl polysulphide.

The reaction described therein likewise is carried out in the presence of acid catalysts such as para-toluene sulphonic acid. Also in this process there is a question of a homogeneously catalytic reaction.

A disadvantage in this process is that the acid catalyst used has to be neutralized after completion of the reaction, e.g., para-toluene sulphonic acid with ammonia, as can be read in Example 1 of U.S. Pat. No. 4,124,645, so that the reaction mixture is not only freed of water and the optionally co-used solvents such as, e.g., benzene, but also the catalyst has to be separated off, since it could cause interference in further reactions and moreover is a drawback as an impurity.

It is a further disadvantage that it is not possible to obtain uniform products with the known process. In this respect, the hydroxyalkyl terminated polymeric polysulphides obtained according to the prior art leave something to be desired as regards the molecular weight distribution of the obtained polymers. For instance, the nonuniformity U is disproportionately high.

U is defined as $$U = \frac{M_w}{M_n} - 1$$

Also as a result of nonuniform polycondensation, molecules with a different structure are formed (block copolymeric structures).

However, for many application purposes, tailored products with a strictly alternating copolymer structure are desired, in particular when these polymeric polysulphides are not only put to use as such, but also should serve as starting products for the preparation of further functionalized polysulphides or for the preparation of polysulphides with a higher molecular weight.

Therefore, there is a need for polymeric hydroxylalkyl terminated polysulphides which stand out due to good properties, in particular as regards their polydispersity and structural uniformity, as well as for a corresponding preparation process.

SUMMARY OF THE INVENTION

Thus, an object of the invention is to provide a process for the preparation of polymeric hydroxyalkyl terminated polysulphides which can be carried out easily and economically (inter alia a higher reaction rate) and which leads to more uniform products as regards both their chemical structure and their molecular weight distribution.

Moreover, the process should be particularly suited to providing polymeric hydroxyalkyl terminated polysulphides which are excellently end-functionalizable through further reactions and which are particularly suited to the structure of higher molecular weight polysulphides.

This object is achieved by a process for the preparation of polymeric hydroxyalkyl terminated polysulphides wherein monomeric bis-hydroxyalkyl polysulphides are reacted with formaldehyde in the presence of acid catalysts, which is characterized in that the acid catalyst is used in the form of a solid acid, and water and optionally co-used solvent and the catalyst are separated off.

Preferably, formaldehyde is used in the form of para-formaldehyde.

As solid acids, acidic ion exchangers are especially advantageous.

Preferably, coarsely porous ion exchangers are used.

Particularly advantageous are ion exchangers of the AMBERLYST® type.

Catalysts of the AMBERLYST® type are commercially available and are sold by Rohm & Haas. Advantageous AMBERLYST® types are the types which are sold under the production designations AMBERLYST® 15, 31, 35, 36, 39, 119, and 131.

Advantageous solid acid catalysts according to the invention are also perfluorinated resins with sulphonic acid groups. These are commercially available, e.g., from Du Pont under the designation NAFION®.

As solid acids which can be used within the framework of the invention, also cationic ion exchangers from the class of Permutites, AMBERLITES®, DOWEX® 50, and LEWATITES® count. As LEWATITES®, which are sold by Bayer, the types K1131, K1221, K1461, K2431, and K2621 have proved especially advantageous.

Further, zeolites in the H-form, such as, e.g., H—Y, H-Beta, H-MCM, and the like, which can exchange the Brönsted centers in H+, are suitable.

As monomeric bis-hydroxyalkyl terminated polysulphide preferably dithiodiglycol(bis-hydroxyethyl disulphide) is used.

This compound can be prepared using the following chemical formula:

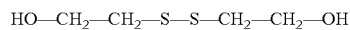

In a particularly advantageous embodiment of the present invention, a bis-hydroxyethyl disulphide is used which was prepared according to a process according to German Patent DE 103 23 839. The process described therein is a process for the preparation of dithiodiglycol through reaction of mercaptoethanol with oxygen, wherein mercaptoethanol is reacted with oxygen or an oxygen-containing gas in the presence of ammonia and/or amines, with use being made of copper or manganese salts. The disclosure of German Patent DE 103 23 839 is expressly incorporated by reference herein in its entirety.

DETAILED DESCRIPTION

The carrying out of the process according to the invention can, e.g., take place in the following manner: starting from a corresponding monomeric dihydroxyalkyl polysulphide, in particular from a corresponding disulphide, preferably from diethanol disulphide, which optionally is dissolved in a suitable solvent, the solution is then mixed with formaldehyde, in particular paraformaldehyde. After the addition of a catalyst, the reaction is carried out at elevated temperature, in particular in a range of 50 to 130, preferably 70° C., in which process there first is about three hours of stirring at 70° C. and subsequently heating with reflux.

The water formed during the reaction is distilled off. Then, there is further heating under reflux and the optionally present solvent is distilled off in vacuo. It is recommended to strip with inert gas in order to remove solvent residues. The desired reaction product is then separated off from the solid catalyst.

The catalyst can be used again.

In a further preferred embodiment of the present invention, dithiodiglycols, paraformaldehyde, and the catalyst are mixed with one another without solvent and heated, the water is removed, and the catalyst is removed from the reaction product after completion of the reaction.

The formed water of reaction can also be drawn off in vacuo, however. For the completion of the reaction, it is recommended to introduce inert gas at about 120° C., in order to remove the remaining traces of water.

When the reaction is carried out with a solvent being used, then solvents such as, in particular, toluene, benzene, and the like, which form an azeotrope with water, are particularly suitable.

The reaction can also be carried out continuously.

In this case, in addition to a stirred vessel cascade, in particular, also one or several tubular reactors, in which the solid catalyst is fixedly arranged, are suitable.

Here, catalysts in granulate or pearl form are suitable, over which formaldehyde and the monomeric polysulphide, in particular dithiodiglycol, are passed at elevated temperature, advantageously at elevated pressure. The water is continuously drawn off over the head, while the reaction product is obtained in the liquid form without further filtration, e.g., as residue.

In this process, also higher temperatures can be employed, e.g., 130° C. and higher; it is also possible to work at slightly increased pressure, e.g., 2-3 bar.

This method, in addition to the advantage of an increased reaction rate, also has the advantage of a lower discharge of formaldehyde, which otherwise is often discharged with the water of reaction in quite a large amount.

Because of the trouble-free separability of the reaction product from the solid catalyst, the neutralization step otherwise required according to the state of the art is dropped, as well as the separation of the reaction product from the neutralized catalyst from the reaction mixture, e.g., by means of a cost-intensive extraction. This is very advantageous. Moreover, the catalyst can be re-used several times.

By setting the molar ratio of the monomeric bis-hydroxyalkyl terminated polysulphide, e.g., of dithiodiglycol, to formaldehyde, and/or the reaction time, it is possible to set the molecular weight of the desired hydroxyalkyl terminated polymeric polysulphide exactly. In this case, number average molecular weights (Mn) of 500 to 20,000 are possible.

Surprisingly, by means of the process according to the invention, a hydroxyalkyl terminated polymeric polysulphide is obtained which has a very narrow molecular weight distribution and which preferably has an nonuniformity of U=1.0-1.4.

In particular, in the case of a continuous method in a tubular reactor very uniform products can be obtained.

Moreover, it has surprisingly turned out that in the case of otherwise equal reaction conditions, the use according to the invention of solid acid catalysts, in comparison with working with homogeneous catalysts according to the familiar state of the art (e.g., with p-toluene sulphonic acid), brings about a noteworthy increase in the reaction rate.

Thus, e.g., Example 4b (as described herein), where according to the invention through use of the catalyst AMBERLYST® 15 a molecular weight of 3,500 g/mol is obtained, shows that under otherwise equal conditions to those according to Example 4a (using a catalyst according to the state of the art), the reaction proceeds more quickly, while at the same time a higher molecular weight is achieved, namely 3,500 instead of 2,300 g/mol. In order to obtain a molecular weight of 2,300 g/mol, according to the invention only about half of the reaction time is needed of that in Comparative Example 5a. Since the uniformity of the obtained products is very high, these are very usable as such, and lead to readily reproducible results. But in addition, they are also very suitable for a further functionalization.

In particular, through reaction with epichlorohydrin epoxidised polysulphides can be prepared. Such a process can be carried out advantageously in a manner analogous to the process described in German publication DE 102 23 283 C1, except that instead of polysulphides having thiol end groups, the polysulphides having hydroxy end groups described herein are used.

These epoxidised products can be used in particular for the subsequent treatment of adhesives, jointing materials, coatings, and the like.

Furthermore, the compounds prepared according to the invention can be easily functionalized through the introduction of terminal double bonds. These compounds for their part can easily be further functionalized.

Compounds with such double bonds are further described in the German patent application DE 102004047893, filed on Oct. 1, 2004.

The process according to the invention can be represented by the following reaction equation:

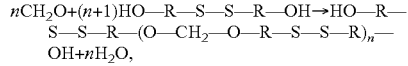

wherein R is an aliphatic hydrocarbon group of the formula —$(CH_2)_x$— with x=2 to 4, preferably 2, and n has the value 5 to 500.

The invention is further described by the following Examples:

EXAMPLE 1

6.8 kg of diethanol disulphide (85%) are dissolved in 2.2 l of toluene and suspended with 1.2 kg of paraformaldehyde (90%) and after the addition of the catalyst (strongly acidic cation exchanger, 25 g AMBERLYST® 15), stirred for 1 h at 70° C. Next, the preparation is heated at 110° C. at reflux. Within 5 h the water of reaction is separated off over a water trap.

After removal of the bulk of water from the reaction mixture, there is heating at reflux for a further 2 h. Next, there is filtering. The solvent is distilled off in vacuo. For removal of solvent residues, there is stripping with nitrogen.

Obtained are 7.1 kg of a bright yellow low-viscous hydroxy terminated polysulphide (15 Pa*s) with a number average molecular weight (Mn) of 1,000 g/mol.

EXAMPLE 2

Through variation of the molar ratio of diethanol disulphide to paraformaldehyde the molar masses of the resulting polymers can be selectively set.

5.8 kg of diethanol disulphide (85%) are dissolved in 2.2 l of toluene and suspended with 1.2 kg of paraformaldehyde (90%) and after the addition of the catalyst (strongly acidic cation exchanger, AMBERLYST® 15; 25 g), stirred for 1 h at 70° C. Next, the preparation is heated at 110° C. at reflux. Within 5 h the water of reaction is separated off over a water trap. There is further heating at reflux for 2 h. Next, there is filtering. The solvent is distilled off in vacuo. For removal of solvent residues, there is stripping with nitrogen.

Obtained are 6.1 kg of a bright yellow low-viscous hydroxy terminated polysulphide (15 Pa*s) with a number average molecular weight (Mn) of 2,500 g/mol.

EXAMPLE 3

The reaction time of Example 2 can be reduced from 5 to 2.5 h by increasing the amount of catalyst to 60 g of AMBERLYST® 15.

Analogously to Example 2, a polymer with a number average molecular weight (Mn) of 2,500 g/mol is obtained.

EXAMPLE 4

Hydroxy Terminated Polysulphide Catalyst Comparison

EXAMPLE 4a

Catalyst: P-toluene Sulphonic Acid 750 g of diethanol disulphide (85%) are dissolved in 450 ml of toluene and suspended with 201 g of paraformaldehyde (90%) and after the addition of 4 g of p-toluene sulphonic acid (catalyst), stirred for 1 h at 70° C. Next, the preparation is heated at 110° C. at reflux. The water of reaction is separated off within 3 h over a water trap. After removal of the bulk of water from the reaction mixture, there is a further 2 h of heating at reflux. Next, there is neutralizing and filtering. The solvent is distilled off in vacuo. For removal of solvent residues, there is stripping with nitrogen.

Obtained are 780 g of a bright yellow low-viscous hydroxy terminated polysulphide (15 Pa*s) with a number average molecular weight (Mn) of 2,300 g/mol.

EXAMPLE 4b

Catalyst: AMBERLYST® 15

When diethanol disulphide and paraformaldehyde are reacted under the conditions described in Example 3a but in the presence of 4 g of AMBERLYST® 15 (catalyst), then a polymer with a molar mass of 3,500 g/mol is obtained. Neutralization does not follow.

Examples 4a and 4b show that according to the invention, in the same amount of time a higher molecular weight is obtained, which means that the reaction takes place considerably more quickly. To arrive at a molecular weight of 2,300 g according to the process in accordance with the invention, about half the time is needed of that employed according to Example 4a.

EXAMPLE 5

Solvent-free Synthesis of Hydroxy Terminated PS 129 g of paraformaldehyde (90%) are suspended in 545 g of diethanol disulphide (85%) and mixed with 2 g of AMBERLYST® 15. Next, the reaction mixture is heated, with stirring, to 120° C. in a closed vessel (e.g., 1-1 glass autoclave of Büchi). When the internal pressure rises above 3 bar, the tension in the vessel is released and the vessel is closed again. After 4 h the tension in the vessel is released and for a further 4 h nitrogen is introduced into the reaction mixture. Next, there is cooling to 50° C. and filtering.

Obtained are 135 g of a bright yellow low-viscous hydroxy terminated polysulphide (15 Pa*s) with a number average molecular weight (Mn) of 2,000 g/mol.

The invention claimed is:

1. A process for the preparation of a polymeric hydroxyalkyl terminated polysulphide, the process comprising:

reacting a monomeric bis-hydroxyalkyl polysulphide with formaldehyde in the presence of an acid catalyst, wherein the acid catalyst is a solid acid, and water is produced during the reaction; and separating off the water and the acid catalyst.

2. The process of claim 1, wherein the monomeric bis-hydroxyalkyl polysulphide is dissolved in a solvent; and wherein the water, the acid catalyst and the solvent are separated off.

3. The process of claim 1, wherein the formaldehyde is in the form of paraformaldehyde.

4. The process of claim 1, wherein the solid acid is an acidic ion exchanger.

5. The process of claim 3, wherein the solid acid is an acidic ion exchanger.

6. The process of claim 4, wherein the acidic ion exchanger is coarsely porous.

7. The process of claim 5, wherein the acidic ion exchanger is coarsely porous.

8. The process of claim 4, wherein the acidic ion exchanger is an AMBERLYST® ion exchanger.

9. The process of claim 6, wherein the acidic ion exchanger is an AMBERLYST® ion exchanger.

10. The process of claim 1, wherein the solid acid is a perfluorinated resin with sulphonic acid groups.

11. The process of claim 2, wherein the solid acid is a perfluorinated resin with sulphonic acid groups.

12. The process of claim 1, wherein the solid acid is a zeolite in the H-form.

13. The process of claim 1, wherein the solid acid is a zeolite in the H-form.

14. The process of claim 1, wherein the monomeric bis-hydroxyalkyl polysulphide is selected from the group consisting of dithiodiglycol (bis-(2-hydroxyethyl)-disulphide and bis-hydroxyethyl disulphide.

15. The process of claim 3, wherein the monomeric bis-hydroxyalkyl polysulphide is selected from the group consisting of dithiodiglycol (bis-(2-hydroxyethyl)-disulphide and bis-hydroxyethyl disulphide.

16. The process of claim 14, wherein the monomeric bis-hydroxyalkyl polysulphide is bis-hydroxyethyl disulphide.

17. The process of claim 3, further comprising heating the reaction mixture, wherein the monomeric bis-hydroxyalkyl polysulphide is a dithiodiglycol.

18. The process of claim 1, wherein the reacting is carried out by a continuous reaction.

19. The process of claim 17, wherein the reacting is carried out by a continuous reaction.

20. The process of claim 1, wherein the reacting is carried out in one or more tubular reactors.

* * * * *